Jan. 2, 1934.    R. FERWERDA    1,942,207

TRUCK BODY AND METHOD OF HEATING SAME

Filed March 12, 1932

INVENTOR.
Ray Ferwerda.
BY
Fay, Oberlin & Fay
ATTORNEYS.

Patented Jan. 2, 1934

1,942,207

UNITED STATES PATENT OFFICE 1,942,207

TRUCK BODY AND METHOD OF HEATING SAME

Ray Ferwerda, Maple Heights, Ohio

Application March 12, 1932. Serial No. 598,314

8 Claims. (Cl. 298—1)

This invention relates, as indicated, to truck bodies, but has reference more particularly to a novel method of heating truck bodies whereby freezing and sticking of the contents of said bodies to the ends, sides or bottom thereof is prevented, and proper dumping of such contents is assured.

In dumping or unloading the contents of garbage dump trucks during cold weather, it has been frequently observed that portions of the garbage freeze and stick to the ends, sides or bottom of the truck bodies and must be broken away therefrom by pick or other suitable means. In addition, the presence of these frozen portions renders proper dumping of the garbage difficult, as these frozen portions interfere with the movement from the body of the mass of garbage.

With the object in view of avoiding the aforesaid difficulties and rendering possible rapid and complete dumping of the contents of a truck body, I have developed a truck body, the end, sides and bottom of which are so constructed as to permit heating thereof by the exhaust gases from the vehicle on which the body is mounted, such heating being wholly reliable, efficient and inexpensive, and well adapted to the purpose at hand. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various structural forms in which the principle of the invention may be used.

Figure 1:
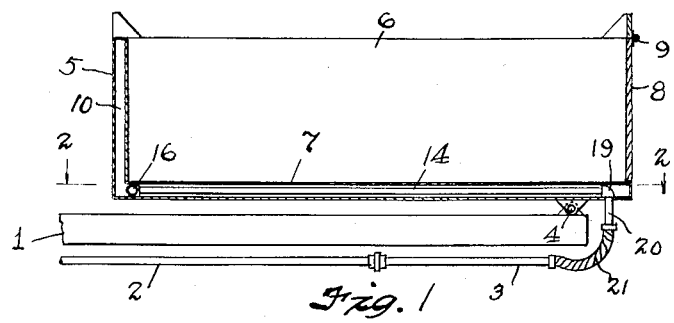
Figure 2:
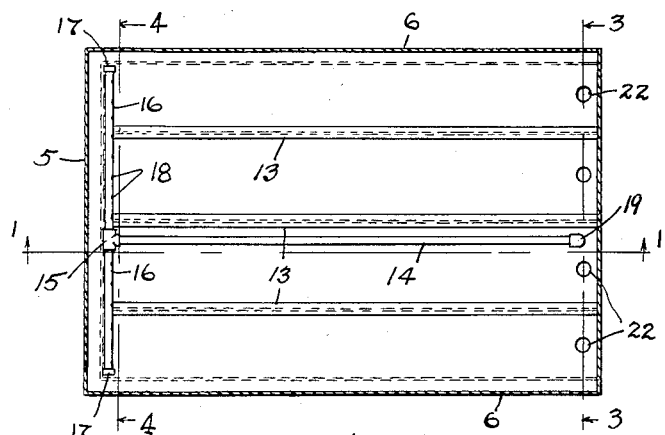
Figure 3:
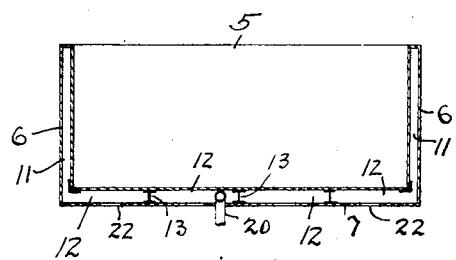
Figure 4:
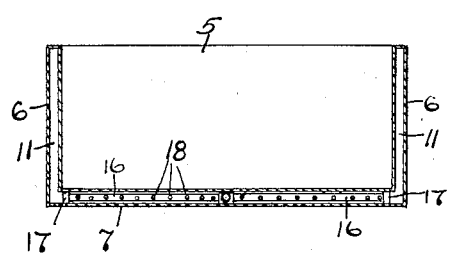
Figure 5:
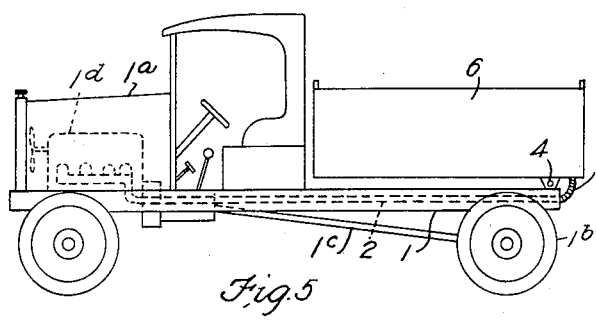

In said annexed drawing:

Fig. 1 is a longitudinal cross sectional view through a dump truck body, taken on a plane substantially indicated by the line 1—1 of Fig. 2; Fig. 2 is a horizontal cross sectional view through the body, taken on a plane substantially indicated by the line 2—2 of Fig. 1; Fig. 3 is a transverse cross sectional view through the body, taken on a plane substantially indicated by the line 3—3 of Fig. 2; Fig. 4 is a transverse cross-sectional view through the body taken on a plane substantially indicated by the line 4—4 of Fig. 2; and Fig. 5 is a view showing a truck embodying the novel features of the present invention.

Referring more particularly to the drawing, 1 represents the frame or chassis of a truck 1a, the rear wheels 1b of which are preferably driven through a propeller or drive shaft 1c by an internal combustion motor 1d or by steam, and which is provided with the usual exhaust pipe 2, from which the muffler has been removed and replaced by a conduit 3.

Pivotally secured to the frame or chassis 1, as at 4, so that it may be tilted for dumping purposes, is a truck body comprising a front end 5, sides 6, and a bottom 7, the rear end of the body, being normally closed by means of a gate 8, hinged to the body as at 9. As clearly shown, the end 5, sides 6, and bottom 7 are formed of spaced plates, which provide therebetween intercommunicating passages 10, 11 and 12 respectively. The plates comprising the bottom 7 of the body are spaced apart by means of longitudinally extending I-beams 13, which also serve to reinforce the body.

Extending longitudinally through one of the passages 12 is a conduit 14, which is secured at one end, as by means of a T connection 15 to a header pipe 16, closed at the ends by caps 17, and provided with a row of spaced apertures 18. The opposite end of the conduit 14 is secured as by means of an elbow connection 19 to a conduit 20. A flexible conduit 21 connects the conduits 3 and 20. The flexibility of this conduit permits tilting movements of the body with respect to the frame 1, and at the same time avoids the breakage which might occur during such tilting movement, were a rigid conduit employed at this point.

The lower plate of the bottom 7 is provided at its rear end with apertures 22.

The truck body is heated in the following manner: Hot exhaust gases from the motor 1d of the truck 1a on which the body is mounted pass through the exhaust pipe 2, conduits 3, 21, 20 and 14 into the header pipe 16, from which they escape through the apertures 18. These hot gases then circulate through the passages 10, 11 and 12, thereby heating the end, sides, and bottom of the truck body, and preventing freezing or sticking of the contents of the body thereto. The gases finally escape through the apertures 22.

It will be understood that in cases where the truck is driven by steam, such steam may be employed instead of exhaust gases to heat the truck body.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a self-propelled road vehicle, the combination with a chassis, of an engine stationarily mounted on said chassis for propelling the same; a material conveying body pivotally mounted on said chassis and tiltable to facilitate dumping of the material therefrom, the walls of said body formed of spaced plates providing passages therein for the circulation of a heating medium therethrough; and a conduit for circulating the heated exhaust gases from said engine through the passages in said body walls, said conduit including a flexible portion whereby tilting of said body is permitted.

2. In a self-propelled road vehicle, the combination with an engine stationarily mounted on the chassis of said vehicle, of a dump body movably mounted with respect to said chassis, the walls of said body being formed of spaced plates providing passages therein for the circulation of a heating medium therethrough, and means for conducting the exhaust gases from said engine to said passages in said dump body in any position thereof.

3. An apparatus of the character described, consisting of a self-propelled road vehicle having a chassis and propelling means in the form of an engine mounted thereon, a dump body mounted on said chassis comprising walls of spaced plates, providing passages therein for the circulation of a heating medium, said walls including, when in normal position, a vertical end, vertical sides and a horizontal bottom, said sides and end communicating with said bottom and being closed at their top portions, and a conduit from the exhaust of said engine entering said bottom at its rear, said conduit having a header thereon adjacent said vertical end, said header having a series of apertures therein for the escape of the exhaust gases from said engine.

4. An apparatus of the character described, consisting of a self-propelled road vehicle having a chassis and propelling means in the form of an engine mounted thereon, a dump body mounted on said chassis comprising walls of spaced plates, providing passages therein for the circulation of a heating medium, said walls including, when in normal position, a vertical end, vertical sides and a horizontal bottom, said sides and end communicating with said bottom and being closed at their top portions, and a conduit from the exhaust of said engine entering said bottom at its rear, said conduit having a header thereon adjacent said vertical end, said header having a series of apertures therein for the escape of the exhaust gases from said engine, and said bottom having escape outlets therein.

5. An apparatus of the character described, consisting of a self-propelled road vehicle having a chassis and propelling means in the form of an engine mounted thereon, a dump body mounted on said chassis comprising walls of spaced plates, providing passages therein for the circulation of a heating medium, said walls including, when in normal position, a vertical end, vertical sides and a horizontal bottom, said sides and end communicating with said bottom and being closed at their top portions, and a conduit from the exhaust of said engine entering said bottom at its rear, said conduit having a header thereon adjacent said vertical end, said header having a series of apertures therein for the escape of the exhaust gases from said engine, and said bottom having escape outlets therein, said escape outlets being located at an end opposite to said first named end.

6. An apparatus of the character described, consisting of a self-propelled road vehicle having a chassis and a propelling means in the form of an engine mounted thereon, a material conveying truck body pivotally mounted on said chassis, and movable about its pivotal mounting to dumping position, said body having a bottom formed of spaced plates providing a passage for the circulation of a heating medium therethrough, an inlet and an outlet for said passage, and a conduit leading from the exhaust of said engine to said inlet, whereby the exhaust gases from said engine may be circulated through said passage to impart the heat thereof to said bottom.

7. A material transportation apparatus having in combination an engine for propelling the same, a material conveying body tiltably mounted on said apparatus, whereby to dump the material, means related to a bottom supporting surface of said conveying body providing a passageway for a heating medium therethrough, and flexible means connecting the passageway with the exhaust of said engine, for transferring exhaust gases to said passageway to heat said supporting surface, the flexible means permitting the body to be tilted.

8. A material transportation apparatus having in combination an engine for propelling the same, a material conveying body tiltably mounted on said apparatus, whereby to dump the material, means related to a bottom supporting surface of said conveying body providing a passageway for a heating medium therethrough, an inlet and an outlet for said passageway, and a flexible conduit leading from the exhaust of said engine to said inlet, whereby the exhaust gases from said engine may be brought in heat transferring relation to said supporting surface and whereby said body may be tilted.

RAY FERWERDA.